(12) United States Patent
Morishige et al.

(10) Patent No.: US 8,882,357 B2
(45) Date of Patent: Nov. 11, 2014

(54) THRUST SLIDING BEARING

(75) Inventors: Kouichi Morishige, Kanagawa (JP);
Takashi Horiguchi, Kanagawa (JP)

(73) Assignee: Oiles Corporation, Tokyo (JP)

( * ) Notice: Subject to any disclaimer, the term of this patent is extended or adjusted under 35 U.S.C. 154(b) by 47 days.

(21) Appl. No.: 13/814,328

(22) PCT Filed: Jun. 15, 2011

(86) PCT No.: PCT/JP2011/003406
§ 371 (c)(1),
(2), (4) Date: Feb. 5, 2013

(87) PCT Pub. No.: WO2012/017591
PCT Pub. Date: Feb. 9, 2012

(65) Prior Publication Data
US 2013/0142462 A1    Jun. 6, 2013

(30) Foreign Application Priority Data

Aug. 6, 2010   (JP) ................................ 2010-178215

(51) Int. Cl.
*F16C 17/04* (2006.01)
*F16C 33/74* (2006.01)
*F16C 33/20* (2006.01)
*F16C 17/18* (2006.01)

(52) U.S. Cl.
CPC .............. *F16C 17/04* (2013.01); *F16C 33/201* (2013.01); *F16C 33/74* (2013.01); *F16C 17/18* (2013.01)
USPC ......................................... 384/420; 384/139

(58) Field of Classification Search
USPC .......... 384/130, 138–140, 143, 147, 420–427
See application file for complete search history.

(56) References Cited

U.S. PATENT DOCUMENTS

| | | | |
|---|---|---|---|
| 4,566,812 A | 1/1986 | Takei et al. | |
| 7,993,061 B2 * | 8/2011 | Watai et al. | 384/420 |
| 8,256,965 B2 * | 9/2012 | Kaneko et al. | 384/420 |
| 2010/0104228 A1 * | 4/2010 | Kaneko | 384/420 |
| 2011/0019951 A1 * | 1/2011 | Kaneko | 384/420 |
| 2011/0135228 A1 * | 6/2011 | Kaneko et al. | 384/420 |

FOREIGN PATENT DOCUMENTS

| | | |
|---|---|---|
| JP | 135265/1983 | 3/1985 |
| JP | 38088/1989 | 10/1990 |
| JP | 2001-27227 | 1/2001 |
| JP | 2001-27228 | 1/2001 |
| JP | 2001-027229 | 1/2001 |
| JP | 2007-303643 | 11/2007 |
| JP | 2009-250278 | 10/2009 |

OTHER PUBLICATIONS

International Search Report for PCT/JP2011/003406 mailed Aug. 9, 2011.
International Search Report in PCT/JP2011/003406 dated Jul. 19, 2011.

* cited by examiner

*Primary Examiner* — James Pilkington
(74) *Attorney, Agent, or Firm* — Nixon & Vanderhye P.C.

(57) ABSTRACT

A thrust sliding bearing includes: a synthetic resin-made upper casing; a synthetic resin-made lower casing which is superposed on the upper casing so as to be rotatable about an axis O in a circumferential direction R relative to the upper casing; a synthetic resin-made thrust sliding bearing piece disposed in an annular space between the upper casing and the lower casing; and a synthetic resin-made seal member for sealing respective other end portions, communicating with the outside, of a gap on an inner peripheral side and a gap on an outer peripheral side in a radial direction A between the upper casing and the lower casing, the gap and the gap respectively communicating with the annular space at their one annular end portions.

3 Claims, 12 Drawing Sheets ent phase of International
Application No. PCT/JP2011/003406 filed 15 Jun. 2001,

THRUST SLIDING BEARING

This application is the U.S. national phase of International Application No. PCT/JP2011/003406 filed 15 Jun. 2001, which designated the U.S. and claims priority to JP 2010-178215 filed 6 Aug. 2010, the entire contents of each of which are hereby incorporated by reference.

TECHNICAL FIELD

The present invention relates to a synthetic resin-made thrust sliding bearing, and more particularly to a thrust sliding bearing which is suitably incorporated as a thrust sliding bearing of a strut-type suspension (Macpherson type) in a four-wheeled motor vehicle.

BACKGROUND ART

In Patent Document 1, a synthetic resin-made sliding bearing is proposed which includes a synthetic resin-made lower casing, a synthetic resin-made upper casing superposed on this lower casing, and a synthetic resin-made sliding bearing means interposed between the upper and lower casings, the synthetic resin-made sliding bearing comprised of an outer resiliently sealing means disposed on an outer peripheral side between the upper and lower casings and an inner resiliently sealing means disposed on an inner peripheral side between the upper and lower casings. In Patent Document 2, a synthetic resin-made sliding bearing is proposed which includes a synthetic resin-made lower casing, a synthetic resin-made upper casing superposed on this lower casing, and a synthetic resin-made thrust sliding bearing member disposed in a space between the upper and lower casings, the synthetic resin-made sliding bearing comprised of an outer sealing means disposed on an outer peripheral side in the space between the upper and lower casings and an inner labyrinth sealing means disposed on an inner peripheral side in the space between the upper and lower casings. In Patent Document 3, a synthetic resin-made sliding bearing is proposed which includes a synthetic resin-made lower casing, a synthetic resin-made upper casing superposed on this lower casing, and a synthetic resin-made sliding bearing means interposed between the upper and lower casings, the synthetic resin-made sliding bearing comprised of a resiliently sealing means which is disposed in such a manner as to cover an outer surface of the lower casing and which seals outer and inner annular openings of a space between the upper and lower casings at both annular end portions. In Patent Document 4, a synthetic resin-made sliding bearing is proposed which includes an upper casing having an annular lower surface, a lower casing which is superposed on this upper casing so as to be rotatable about an axis of the upper casing and has an annular upper surface, and an annular thrust sliding bearing piece disposed in an annular space between the annular lower surface and the annular upper surface, the sliding bearing comprised of a sealing means disposed on at least one side of an outer peripheral side and an inner peripheral side of the annular space. Furthermore, in Patent Document 5, a synthetic resin-made sliding bearing is proposed which includes a synthetic resin-made upper casing having an annular lower surface, a synthetic resin-made lower casing having an annular upper surface, and a thrust sliding bearing piece disposed in an annular gap between the annular lower surface and the annular upper surface.

PRIOR ART DOCUMENTS

Patent Documents

[Patent Document 1] JP-A-2001-27227
[Patent Document 2] JP-A-2001-27228
[Patent Document 3] JP-A-2001-27229
[Patent Document 4] JP-A-2007-303643
[Patent Document 5] JP-A-2009-250278

SUMMARY OF THE INVENTION

Problems that the Invention is to Solve

Incidentally, with the sliding bearing of Patent Document 1, in order to seal respective gaps on the inner and outer peripheral sides between the upper and lower casings, the inner resiliently sealing means and outer resiliently sealing means which are separate members are disposed in the respective gaps, so that time is required in the assembly operation and therefore there is a possibility of causing a rise in the manufacturing cost. With the sliding bearing of Patent Document 2, since the labyrinth sealing means is used to seal the inner gap between the upper and lower casings, the characteristic of preventing the ingress of dust and muddy water from the gap on the inner peripheral side is slightly inferior in comparison with the resiliently sealing means. With the sliding bearing of Patent Document 3, since the resiliently sealing means for sealing the respective gaps on the inner and outer peripheral sides between the upper and lower casings is disposed on an outer surface of the lower casing, there is a possibility of the resiliently sealing means coming off from the lower casing when used over extended periods of time. With the sliding bearing of Patent Document 4, in order to seal respective gaps on the inner and outer peripheral sides between the upper and lower casings, the inner resiliently sealing means and outer resiliently sealing means which are separate members are disposed in the respective gaps, so that time is required in the assembly operation and therefore there is a possibility of causing a higher cost in the same way as the sliding bearing of Patent Document 1. With the sliding bearing of Patent Document 5, since the labyrinth sealing means is used to seal the respective gaps on the inner and outer peripheral sides between the upper and lower casings, the characteristic of preventing the ingress of dust and muddy water from the gaps on the inner and outer peripheral sides is slightly inferior in comparison with the resiliently sealing means. None of these sliding bearings are yet satisfactory concerning the manufacturing cost, durability, and sealability.

The present invention has been devised in view of the above-described aspects, and its object is to provide a thrust sliding bearing which excels in the assembling efficiency and replaceability, makes it possible to reduce the manufacturing cost, and is capable of further improving the durability and sealability.

Means for Solving the Problems

A thrust sliding bearing in accordance with the present invention comprises: a synthetic resin-made upper casing integrally including an annular upper casing base portion having an annular lower surface in an axial direction, an inner peripheral-side suspended cylindrical portion suspended from a radial inner peripheral end portion of the annular lower surface of the upper casing base portion, and an outer peripheral-side suspended cylindrical portion suspended from a radial outer peripheral end portion of the annular lower surface of the upper casing base portion; a synthetic resin-made lower casing integrally including an annular lower casing base portion having an annular upper surface in the axial direction and superposed on said upper casing so as to be rotatable about an axis relative to said upper casing and an annular protrusion protruding from the annular upper surface of the lower casing base portion toward the annular lower surface of the upper casing base portion; a synthetic resin-made thrust sliding bearing piece disposed in an annular space between the annular lower surface of the upper casing base portion and the annular upper surface of the lower casing base portion, so as to be brought at an axial annular upper surface and a radial cylindrical inner peripheral surface thereof into slidable contact with the annular lower surface of the upper casing base portion and a radial outer peripheral surface of the inner peripheral-side suspended cylindrical portion, while being brought at an axial annular lower surface and a radial cylindrical outer peripheral surface thereof into contact with an axial annular upper surface and a radial cylindrical inner peripheral surface of the annular protrusion; and a synthetic resin-made seal member having on a radial inner peripheral side thereof a flexible inner peripheral-side annular seal portion which is brought into contact with a radial inner peripheral surface of the inner peripheral-side suspended cylindrical portion of the upper casing so as to seal a gap between the inner peripheral-side suspended cylindrical portion of the upper casing and the lower casing base portion of the lower casing, having on a radial outer peripheral side thereof a flexible outer peripheral-side annular seal portion which is brought into contact with an radial inner peripheral surface of the outer peripheral-side suspended cylindrical portion of the upper casing so as to seal a gap between the outer peripheral-side suspended cylindrical portion of the upper casing and the lower casing base portion of the lower casing, and having a plurality of connecting portions arranged by being spaced apart from each other in a direction about the axis, so as to connect to each other the inner peripheral-side annular seal portion and the outer peripheral-side annular seal portion, wherein each of the plurality of connecting portions is passed between the thrust sliding bearing piece and the annular protrusion of the lower casing and is integrally connected at one end portion thereof to the inner peripheral-side annular seal portion and at another end portion thereof to the outer peripheral-side annular seal portion.

According to the thrust sliding bearing in accordance with the present invention, each of the plurality of connecting portions is integrally connected at its one end portion to the inner peripheral-side annular seal portion and at its other end portion to the outer peripheral-side annular seal portion, so that the number of parts can be reduced, and the assembling efficiency and the replaceability are made to excel, making it possible to attain a reduction in the manufacturing cost. Moreover, since each of the plurality of connecting portions is passed between the thrust sliding bearing piece and the annular protrusion of the lower casing, the durability can be improved by eliminating the possibility of coming off. In addition, since the seal member has the inner peripheral-side annular seal portion and the outer peripheral-side annular seal portion for sealing the gaps between the inner peripheral-side suspended cylindrical portion of the upper casing and the lower casing base portion of the lower casing on the radial inner peripheral side and outer peripheral side, the sealability can be further improved.

In a preferred example of the thrust sliding bearing in accordance with the present invention, each of the connecting portions of said seal member has a radial connecting portion which is integrally connected at one radial end portion thereof to the outer peripheral-side annular seal portion and an axial connecting portion which is integrally connected at one axial end portion thereof to another radial end portion of the radial connecting portion and at another axial end portion thereof to the inner peripheral-side annular seal portion, wherein the annular protrusion of said lower casing has upper surface grooves which are arranged on an axial upper surface thereof by being spaced apart from each other in a direction about the axis and receive respective ones of the radial connecting portions of the connecting portions and inner peripheral surface grooves which are arranged on a radial inner peripheral surface thereof by being spaced apart from each other in the direction about the axis and connected to respective ones of the upper surface grooves and receive respective ones of the axial connecting portions of the connecting portions, wherein the upper surface of the annular protrusion of the lower casing excluding the upper surface grooves is positioned flush with or higher than an axial upper surface of the radial connecting portion of the connecting portion, and the inner peripheral surface of the annular protrusion of the lower casing excluding the inner peripheral surface grooves is positioned flush with or radially inwardly of a radial inner side surface of the axial connecting portion of the connecting portion, and wherein said thrust sliding bearing piece has a radial bearing piece portion which is in contact with the upper surface of the annular protrusion of the lower casing and an axial bearing piece portion which is in contact with the inner peripheral surface of the annular protrusion of the lower casing.

In the thrust sliding bearing of this example, the radial bearing piece portion may be in contact with the upper surface of the annular protrusion of the lower casing and the upper surface of the radial connecting portion of the connecting portion, and the axial bearing piece portion may be in contact with the inner peripheral side surface of the annular protrusion of the lower casing and the inner side surface of the axial connecting portion of the connecting portion. Alternatively, the radial bearing piece portion may be in contact with the upper surface of the annular protrusion of the lower casing while having a gap with the upper surface of the radial connecting portion of the connecting portion, and may be in contact with the inner peripheral surface of the annular protrusion of the lower casing while having a gap with the inner side surface of the axial connecting portion of the connecting portion.

In another preferred example, the annular protrusion has an annular notched stepped portion on a radial outer peripheral portion of the upper surface thereof, and the flexible outer peripheral-side annular seal portion has an annular outer peripheral seal base portion which is integrally connected at a radial inner peripheral end portion thereof to a radial outer end portion of the radial connecting portion and is fitted to the notched stepped portion and a flexible outer peripheral seal portion which is connected at a radial inner peripheral end portion thereof to a radial outer peripheral end portion of the outer peripheral seal base portion and is brought into contact with an inner peripheral surface of the outer peripheral-side suspended cylindrical portion of the upper casing. The outer peripheral seal portion extends diagonally downwardly from the inner peripheral end portion which has a smaller axial thickness than the axial thickness of the outer peripheral seal base portion and which is connected to the radial outer peripheral end portion of the outer peripheral seal base portion.

The lower casing has integrally with the lower casing base portion an annular inner peripheral-side protrusion protruding from a radial inner peripheral portion of the annular upper surface of the lower casing base portion toward an annular lower surface of the upper casing base portion so as to form a inner peripheral-side annular recess in cooperation with the inner peripheral surface of the annular protrusion, and the inner peripheral-side annular seal portion has an annular inner peripheral seal base portion which is integrally connected at a radial outer peripheral end portion thereof to an axial lower end portion of the axial connecting portion and which is fitted to the inner peripheral-side annular recess, as well as a flexible inner peripheral seal portion which is connected at a radial outer peripheral end portion to a radial inner peripheral end portion of the inner peripheral seal base portion and which is brought into contact with the outer peripheral surface of the inner peripheral-side suspended cylindrical portion of the upper casing. The inner peripheral seal portion may extend diagonally downwardly from the outer peripheral end portion which has a smaller axial thickness than the inner peripheral seal base portion and which is connected to the radial inner peripheral end portion of the inner peripheral seal base portion.

The upper casing may have an annular seat portion formed integrally on a radial central portion of an axial annular upper surface of the upper casing base portion.

In a preferred example, the inner peripheral-side suspended cylindrical portion has a thick-walled cylindrical portion connected at its axial upper end portion to the radial inner peripheral end portion of the annular lower surface of the upper casing base portion, as well as a thin-walled cylindrical portion which is connected at its axial upper end portion to an axial lower end portion of the thick-walled cylindrical portion and is thinner-walled relative to the thick-walled cylindrical portion. The inner peripheral-side annular seal portion is in contact with a radial cylindrical inner peripheral surface of the thin-walled cylindrical portion, and the outer peripheral-side suspended cylindrical portion includes a cross-sectionally trapezoidal cylindrical portion which is connected at its axial upper end portion to a radial outer peripheral end portion of the annular lower surface of the upper casing base portion and has an inner peripheral surface which is gradually enlarged in diameter as viewed in the axial direction away from the annular lower surface of the upper casing base portion, as well as an enlarged cylindrical portion which is connected at its axial upper end portion to an axial lower end portion of the cross-sectionally trapezoidal cylindrical portion and has an inner peripheral surface which is gradually reduced in diameter as viewed in the axial direction away from the axial lower end portion of the cross-sectionally trapezoidal cylindrical portion and is gradually enlarged in diameter as viewed in the direction away from this reduced-diameter end, the outer peripheral-side annular seal portion being in contact with the cross-sectionally trapezoidal cylindrical portion.

In a preferred example, the annular protrusion has an arcuate recessed outer peripheral surface which is connected at its axial lower end portion to an outer peripheral end portion of the annular upper surface of the lower casing base portion and is gradually reduced in diameter as viewed in the axial direction away from the annular upper surface of the lower casing base portion.

The thrust sliding bearing in accordance with the present invention is preferably used as a thrust sliding bearing of a strut-type suspension in a four-wheeled motor vehicle.

The synthetic resin for forming the upper casing and the lower casing may be a thermoplastic synthetic resin such as polyacetal resin, polyamide resin, or polyester resin. In addition, the synthetic resin for forming the thrust sliding bearing piece may be a thermoplastic synthetic resin such as polyacetal resin, polyamide resin, polyolefin resin, or polyester resin. As the synthetic resin for forming the seal member, it is possible to cite polyurethane as a preferred example.

Advantages of the Invention

According to the present invention, it is possible to provide a thrust sliding bearing which excels in the assembling efficiency and replaceability, makes it possible to reduce the manufacturing cost, and is capable of further improving the durability and sealability.

MODE FOR CARRYING OUT THE INVENTION

Figure 1:
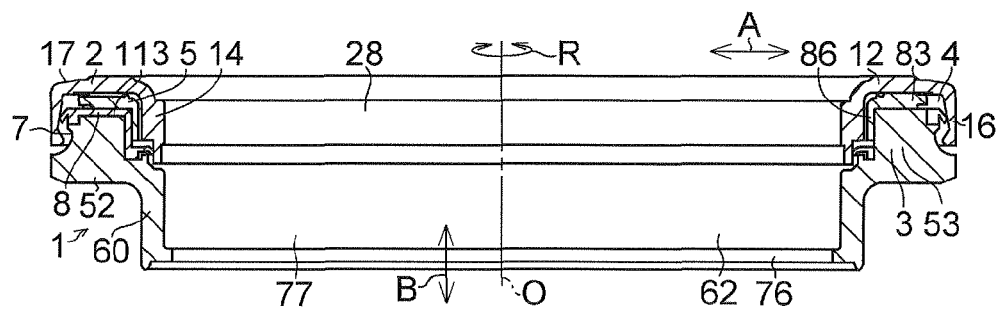
FIG. 1 is an explanatory cross-sectional view, taken in the direction of arrow I-I shown in FIG. 3, of a preferred embodiment of the present invention.
Figure 2:
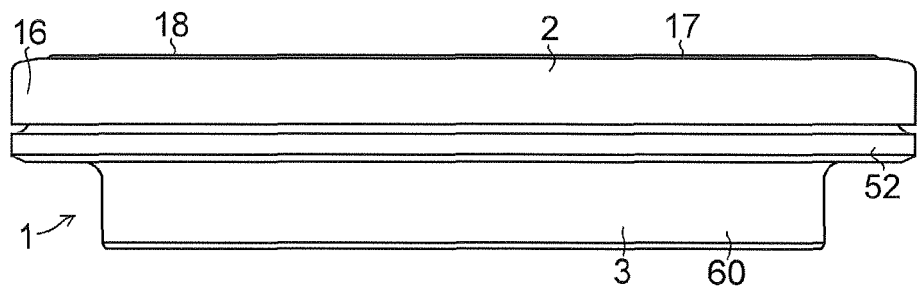
FIG. 2 is an explanatory front elevational view of the embodiment shown in FIG. 1.
Figure 3:
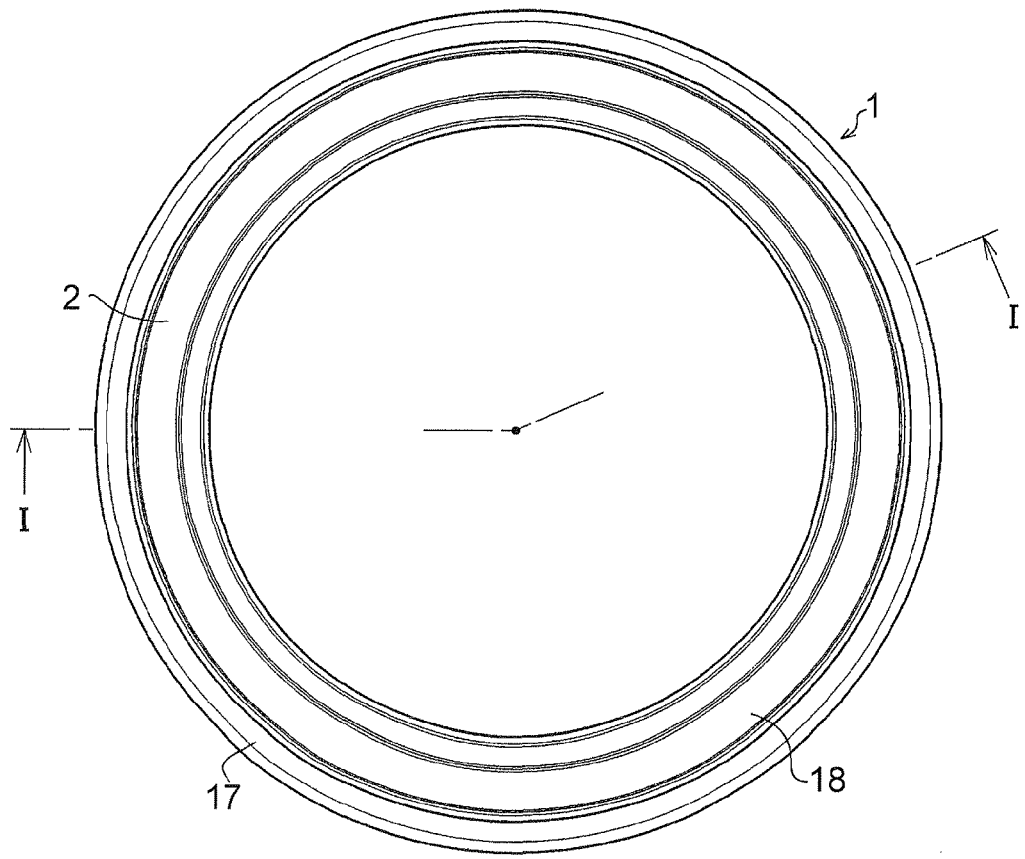
FIG. 3 is an explanatory plan view of the embodiment shown in FIG. 1.
Figure 4:
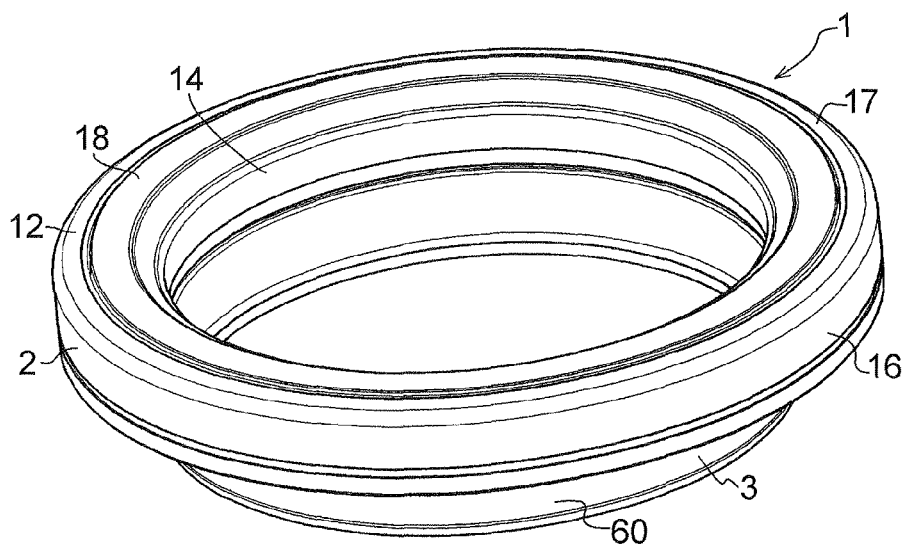
FIG. 4 is an explanatory perspective view of the embodiment shown in FIG. 1.

Hereafter, a more detailed description will be given of the present invention with reference to the preferred embodiment illustrated in the drawings. It should be noted that the present invention is not limited to the embodiment.

In FIGS. 1 to 5, a thrust sliding bearing 1 in accordance with this embodiment for use in a strut-type suspension of a four-wheeled motor vehicle is comprised of a synthetic resin-made upper casing 2 which is fixed to a vehicle body side via a mounting member; a synthetic resin-made lower casing 3 which is superposed on the upper casing 2 so as to be rotatable about an axis O in a circumferential direction R relative to the upper casing 2 and is fixed to a spring seat side of a coil spring of the suspension; a synthetic resin-made thrust sliding bearing piece 5 disposed in an annular space 4 between the upper casing 2 and the lower casing 3; and a synthetic resin-made seal member 8 for sealing respective other end portions, communicating with the outside, of a gap 6 on an inner peripheral side and a gap 7 on an outer peripheral side in a radial direction A between the upper casing 2 and the lower casing 3, the gap 6 and the gap 7 respectively communicating with the annular space 4 at their one annular end portions.

Figure 5:
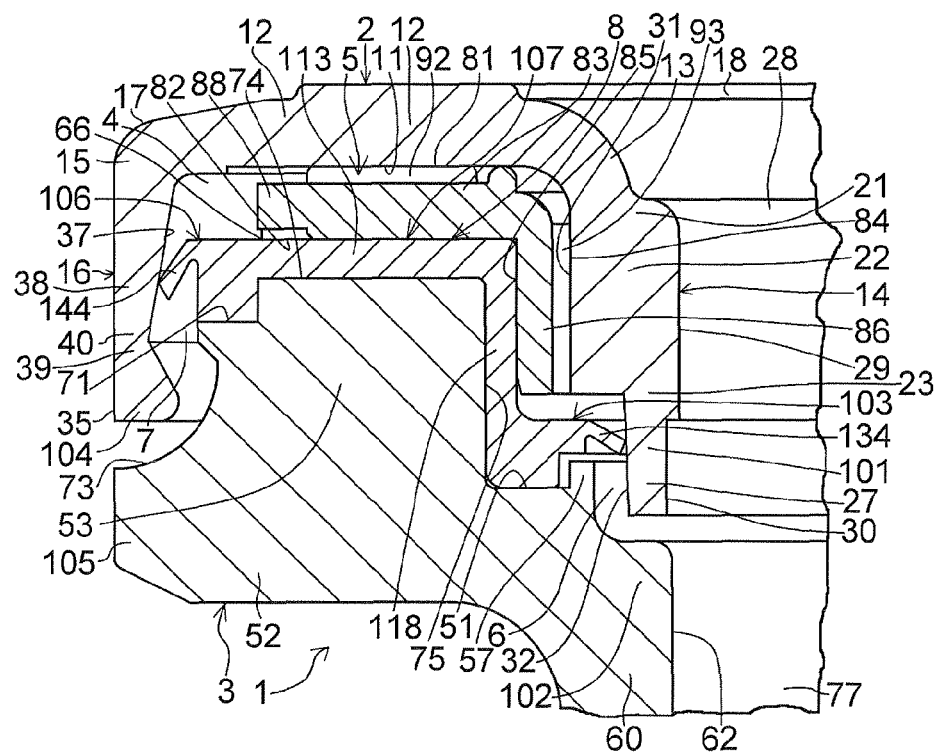
FIG. 5 is an explanatory partially enlarged cross-sectional view of the embodiment shown in FIG. 1.
Figure 6:
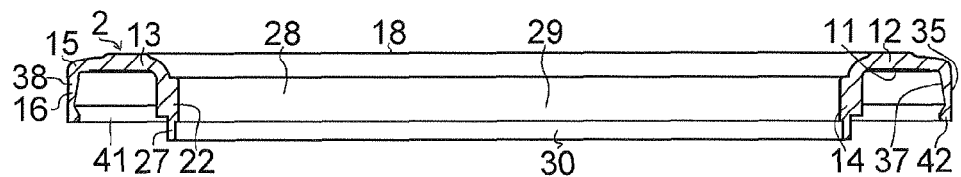
FIG. 6 an explanatory cross-sectional view of an upper casing of the embodiment shown in FIG. 1.
Figure 7:
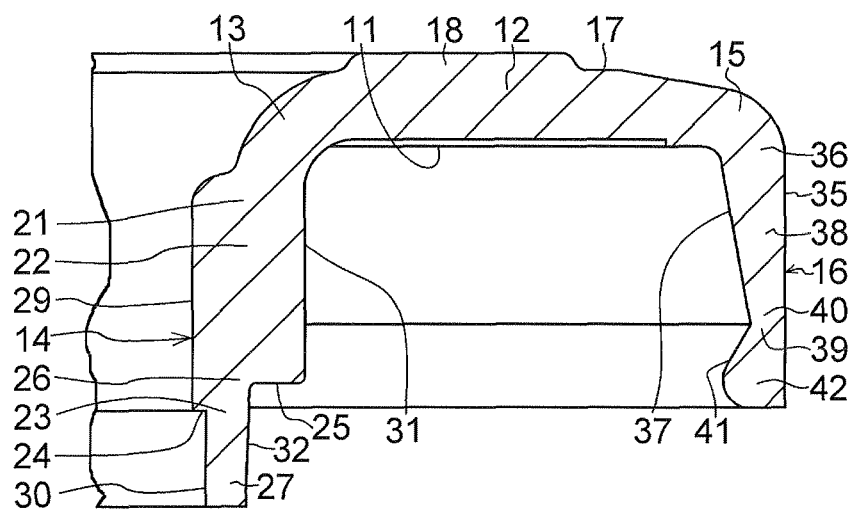
FIG. 7 is an explanatory partially enlarged cross-sectional view of the upper casing shown in FIG. 1.
Figure 8:
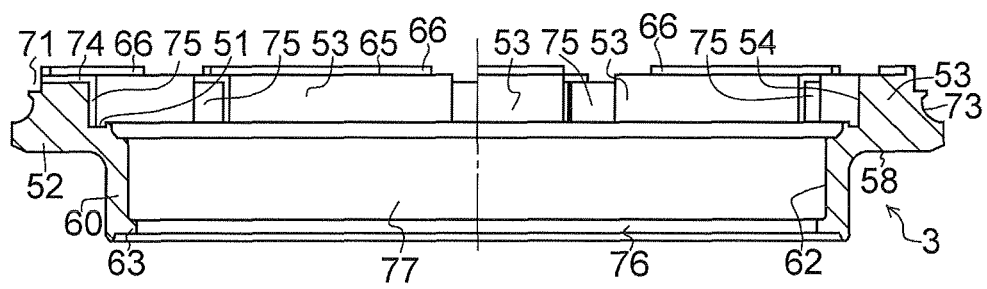
FIG. 8 is an explanatory cross-sectional view, taken in the direction of arrow VIII-VIII shown in FIG. 9, of a lower casing of the embodiment shown in FIG. 1.
Figure 9:
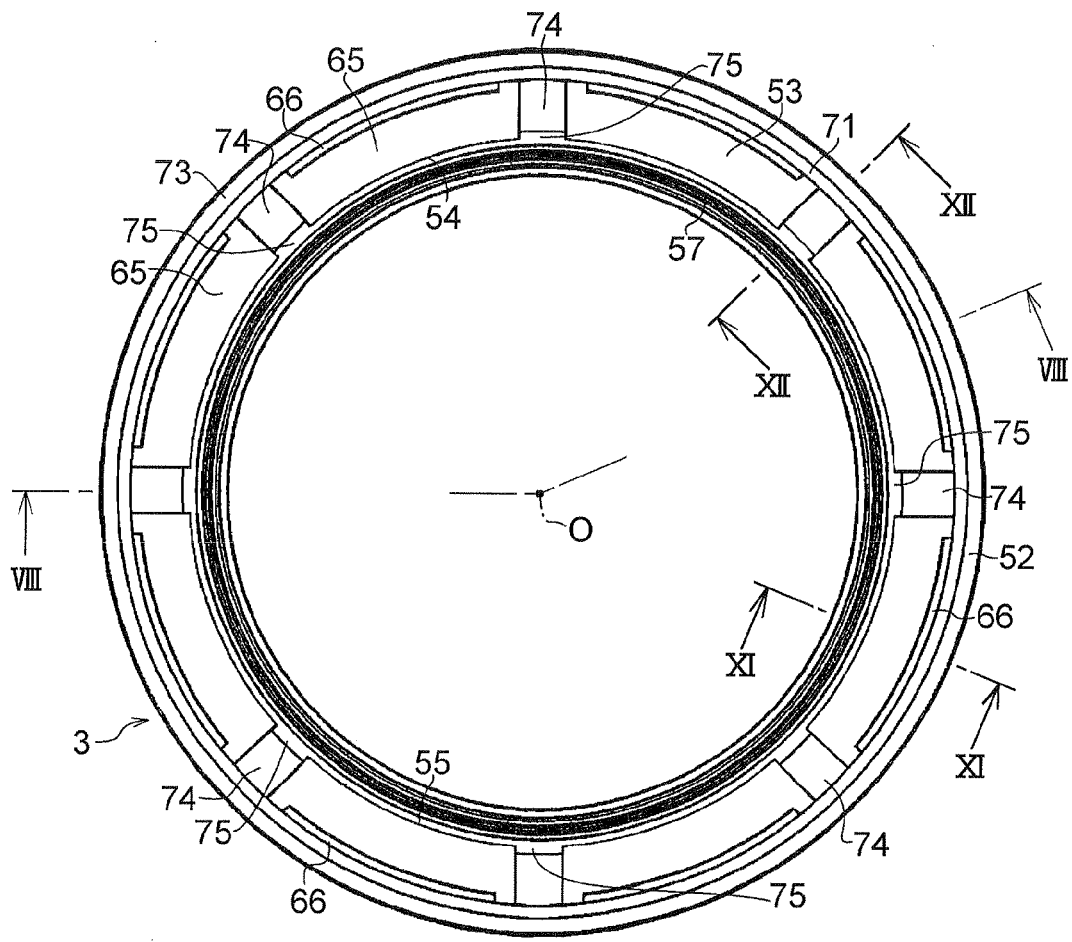
FIG. 9 is an explanatory plan view of the lower casing of the embodiment shown in FIG. 1.
Figure 10:
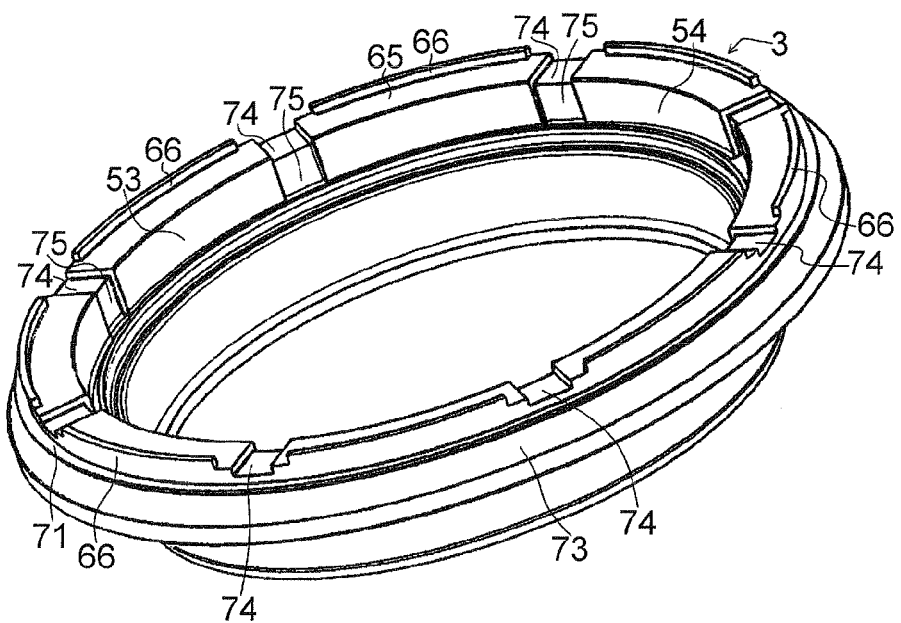
FIG. 10 is an explanatory perspective view of the lower casing of the embodiment shown in FIG. 1.
Figure 11:
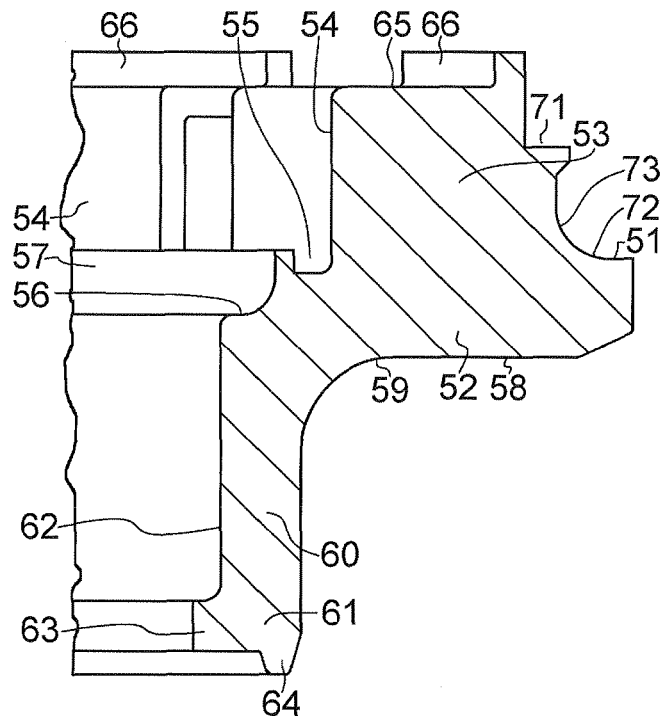
FIG. 11 is an explanatory cross-sectional view, taken in the direction of arrow XI-XI shown in FIG. 9, of the lower casing of the embodiment shown in FIG. 1.
Figure 12:
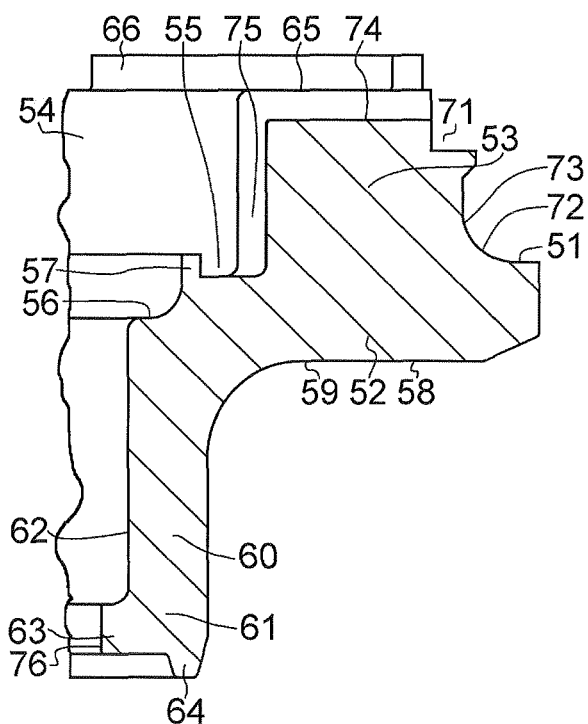
FIG. 12 is an explanatory cross-sectional view, taken in the direction of arrow XII-XII shown in FIG. 7, of the lower casing of the embodiment shown in FIG. 1.
Figure 13:
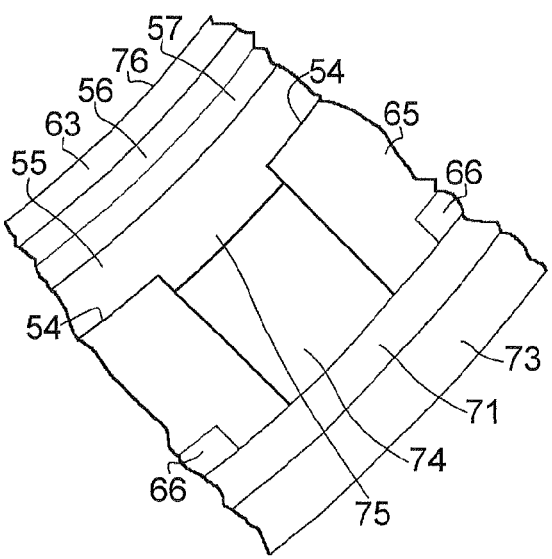
FIG. 13 is an explanatory partially enlarged plan view of the lower casing of the embodiment shown in FIG. 1.
Figure 14:
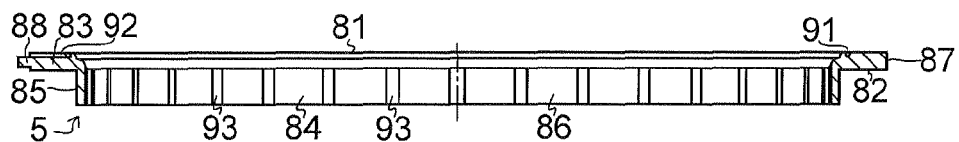
FIG. 14 is an explanatory cross-sectional view, taken in the direction of arrow XIV-XIV shown in FIG. 15, of a thrust sliding bearing piece of the embodiment shown in FIG. 1.
Figure 15:
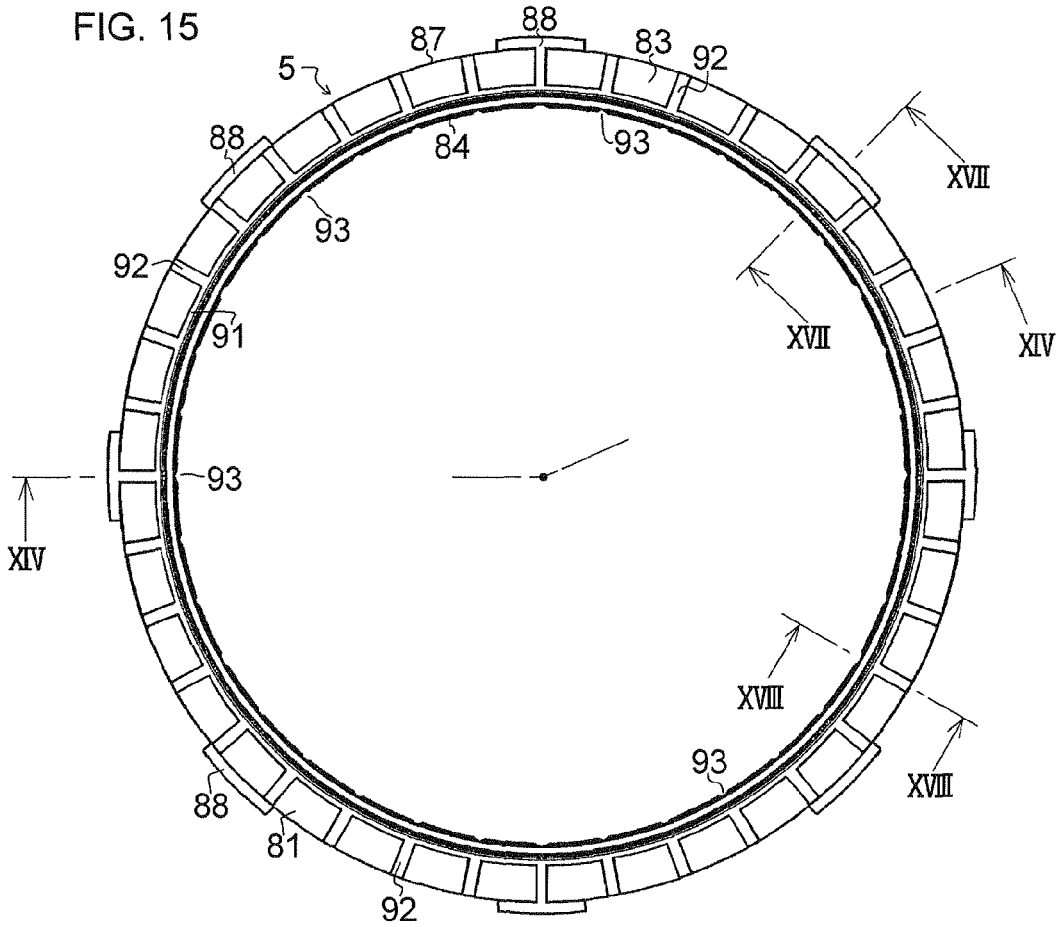
FIG. 15 is an explanatory plan view of the thrust sliding bearing piece of the embodiment shown in FIG. 1.
Figure 16:
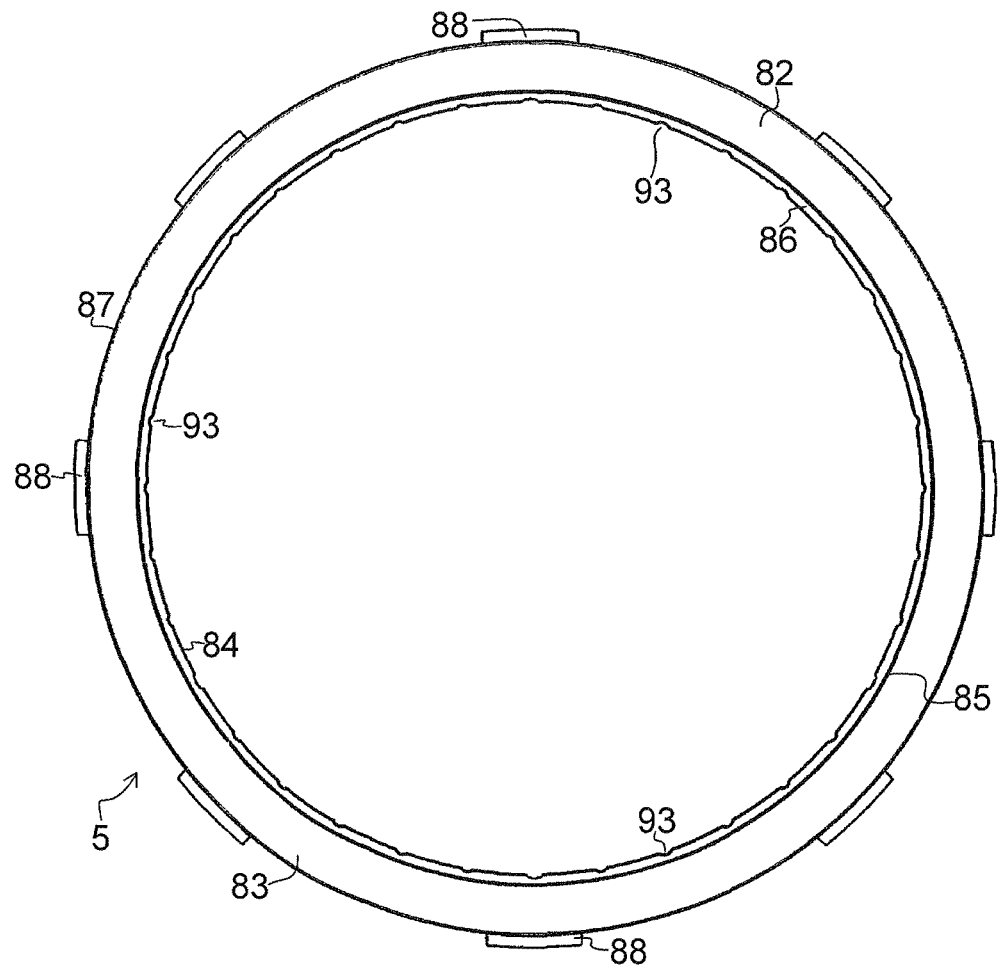
FIG. 16 is an explanatory bottom view of the thrust sliding bearing piece of the embodiment shown in FIG. 1.
Figure 17:
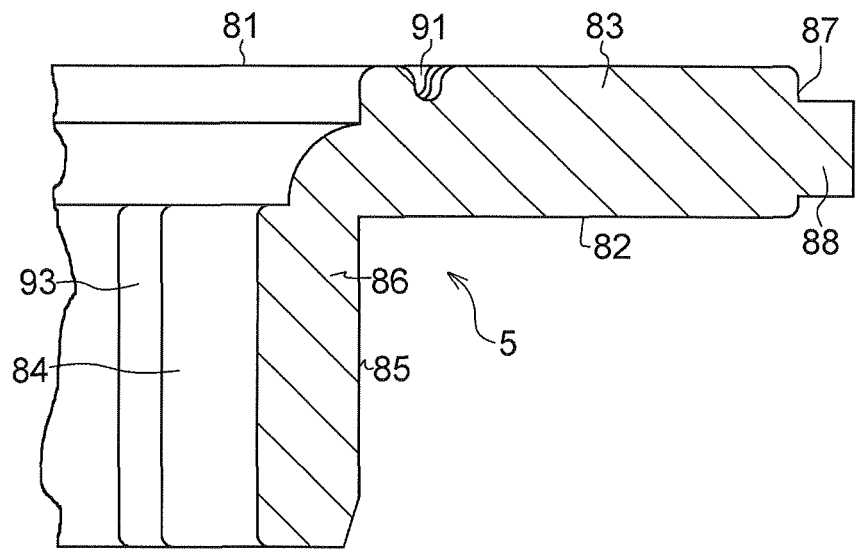
FIG. 17 is an explanatory cross-sectional view, taken in the direction of arrow XVII-XVII shown in FIG. 15, of the thrust sliding bearing piece of the embodiment shown in FIG. 1.
Figure 18:
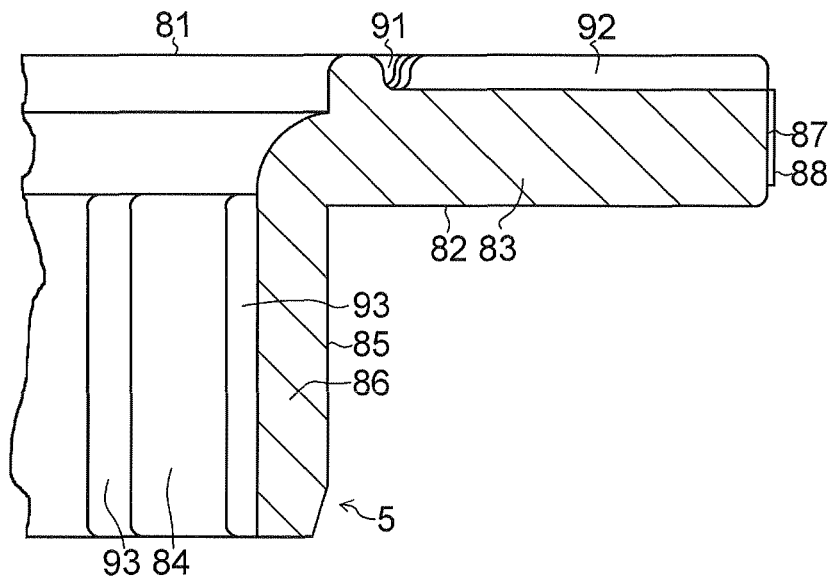
FIG. 18 is an explanatory view, taken in the direction of arrow XVIII-XVIII shown in FIG. 15, of the thrust sliding bearing piece of the embodiment shown in FIG. 1.
Figure 19:
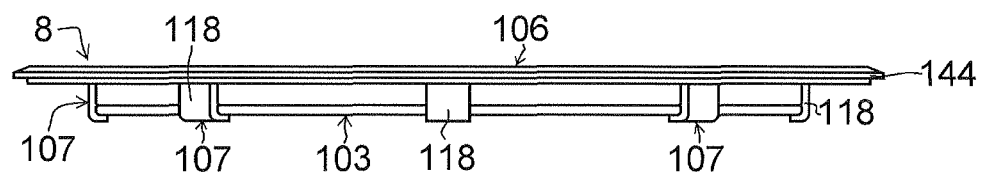
FIG. 19 is an explanatory front elevational view of a seal member of the embodiment shown in FIG. 1.
Figure 20:
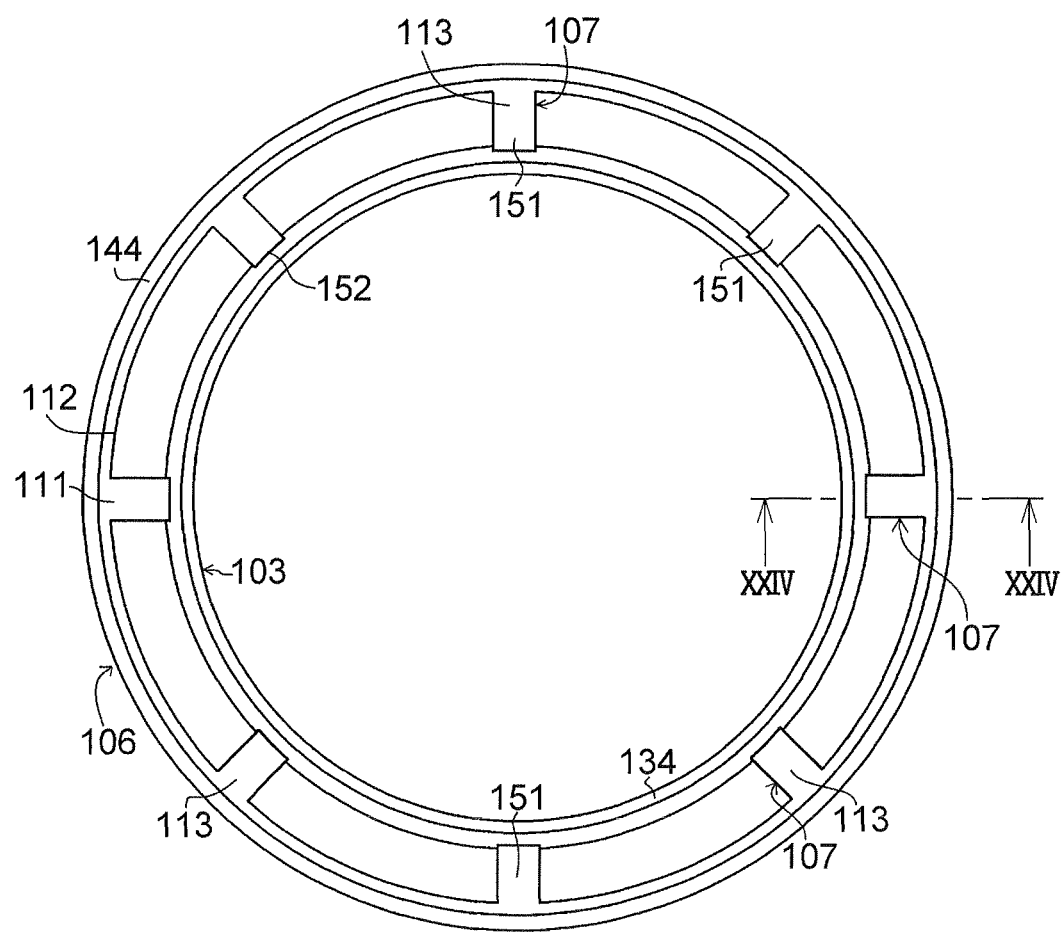
FIG. 20 is an explanatory front elevational view of the seal member of the embodiment shown in FIG. 1.
Figure 21:
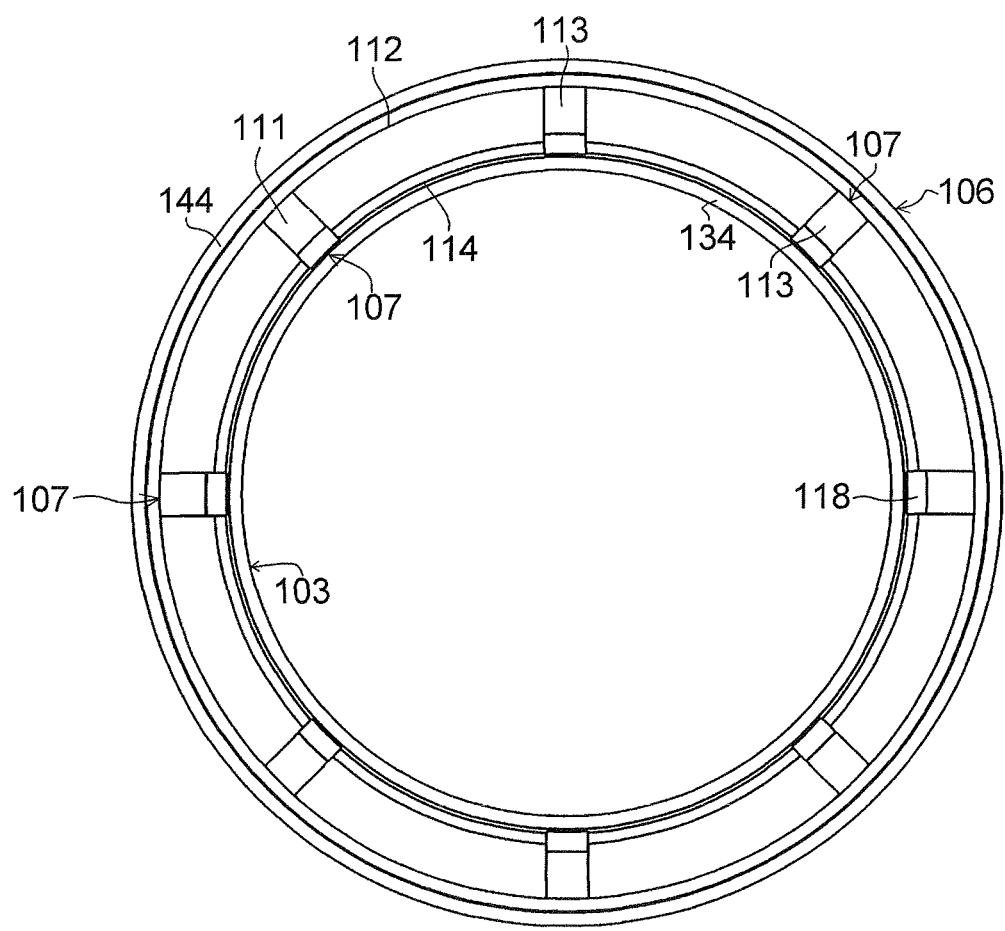
FIG. 21 is an explanatory bottom view of the seal member of the embodiment shown in FIG. 1.
Figure 22:
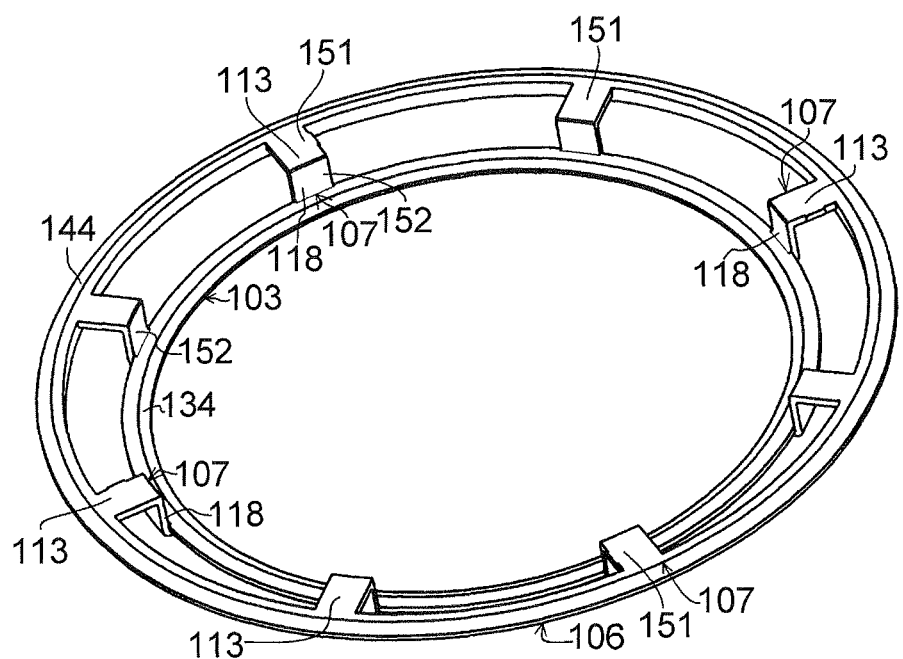
FIG. 22 is an explanatory perspective view of a front side of the seal member of the embodiment shown in FIG. 1.
Figure 23:
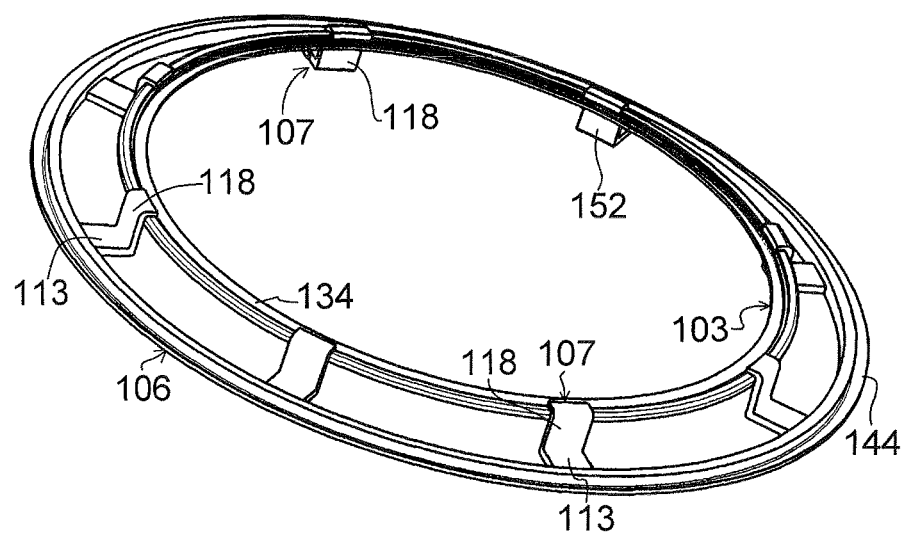
FIG. 23 is an explanatory perspective view of a bottom side of the seal member of the embodiment shown in FIG. 1.
Figure 24:
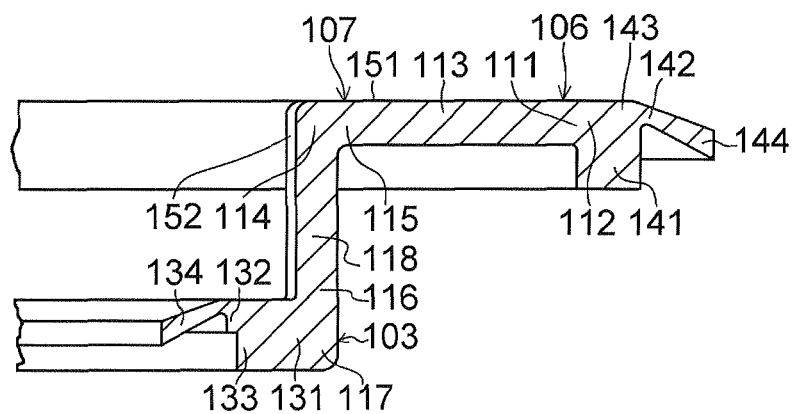
FIG. 24 is an explanatory view, taken in the direction of arrow XXIV-XXIV shown in FIG. 20, of the seal member of the embodiment shown in FIG. 1.

As particularly shown in detail in FIGS. 5 to 7, the upper casing 2 integrally includes an annular upper casing base portion 12 having an annular lower surface 11 in an axial direction B, an inner peripheral-side suspended cylindrical portion 14 suspended from an inner peripheral end portion 13 in a radial direction A of the annular lower surface 11 of the upper casing base portion 12, an outer peripheral-side suspended cylindrical portion 16 suspended from an outer peripheral end portion 15 in the radial direction A of the annular lower surface 11 of the upper casing base portion 12, and an annular seat portion 18 formed protrudingly on a central portion in the radial direction A of an annular upper surface 17 of the upper casing base portion 12.

The inner peripheral-side suspended cylindrical portion 14 has a thick-walled cylindrical portion 22 connected at its upper end portion 21 to the inner peripheral end portion 13 of the annular lower surface 11 of the upper casing base portion 12, as well as a thin-walled cylindrical portion 27 which is connected at its upper end portion 23 to a lower end portion 26 of the thick-walled cylindrical portion 22 via an inner peripheral-side stepped annular surface 24 and an outer peripheral-side stepped annular surface 25 and is thinner-walled relative to the thick-walled cylindrical portion 22.

The thick-walled cylindrical portion 22 and the thin-walled cylindrical portion 27 respectively have cylindrical inner peripheral surfaces 29 and 30 which define a through hole 28 through which a shaft member of a strut-type suspension is inserted. The thick-walled cylindrical portion 22 has a cylindrical outer peripheral surface 31, and the thin-walled cylindrical portion 27 has a cylindrical outer peripheral surface 32 smaller in diameter than the outer peripheral surface 31.

The outer peripheral-side suspended cylindrical portion 16 having a cylindrical outer peripheral surface 35 includes a cross-sectionally trapezoidal cylindrical portion 38 which is connected at its upper end portion 36 to the outer peripheral end portion 15 of the annular lower surface 11 of the upper casing base portion 12 and has an inner peripheral surface 37 which is gradually enlarged in diameter as viewed in a direction away from the annular lower surface 11 of the upper casing base portion 12, as well as an enlarged cylindrical portion 42 which is connected at its upper end portion 39 to a lower end portion 40 of the cross-sectionally trapezoidal cylindrical portion 38 and has an inner peripheral surface 41 which is gradually reduced in diameter as viewed in a direction away from the lower end portion 40 of the cross-sectionally trapezoidal cylindrical portion 38 and is gradually enlarged in diameter as viewed in a direction away from this reduced-diameter end.

As particularly shown in detail in FIG. 5 and FIGS. 8 to 13, the lower casing 3 integrally includes an annular lower casing base portion 52 having an annular upper surface 51; an annular protrusion 53 protruding from the annular upper surface 51 of the lower casing base portion 52 toward the annular lower surface 11 of the upper casing base portion 12; an annular inner peripheral-side protrusion 57 protruding from the annular upper surface 51 toward the annular lower surface 11 of the upper casing base portion 12 on an inner peripheral side 56 of the annular upper surface 51 of the lower casing base portion 52 so as to form an inner peripheral-side annular recess 55 in cooperation with a cylindrical inner peripheral surface 54 in the radial direction A of the annular protrusion 53; a hollow cylindrical portion 60 protruding from an inner peripheral portion 59 of an annular lower surface 58 of the lower casing base portion 52 so as to extend away from the annular lower surface 58; an annular protruding portion 63 protruding inwardly from a cylindrical inner peripheral surface 62 of the hollow cylindrical portion 60 at an end portion 61 of the hollow cylindrical portion 60; an annular protruding portion 64 protruding from the end portion 61 of the hollow cylindrical portion 60; and a plurality of projections 66 which project from an outer peripheral edge portion of an annular upper surface 65 of the annular protrusion 53 toward the annular lower surface 11 of the upper casing base portion 12 and are arranged along the outer peripheral edge portion of the annular upper surface 65 in such a manner as to be spaced apart from each other in the direction R about the axis (circumferential direction R).

The annular protrusion 53 includes an annular notched stepped portion 71 at an outer peripheral portion of its upper surface 65; an annular arcuate recessed outer peripheral surface 73 which is connected at its lower end portion 72 to the outer peripheral end portion of the annular upper surface 51 of the lower casing base portion 52 and is gradually reduced in diameter as viewed in a direction away from the annular upper surface 51 of the lower casing base portion 52; a plurality of upper surface grooves 74 arranged on its upper surface 65 by being spaced apart from each other at equal intervals in the circumferential direction R; and a plurality of inner peripheral surface grooves 75 which are arranged on its inner peripheral surface 54 by being spaced apart from each other at equal intervals in the circumferential direction R in such a manner as to respectively communicate with the upper surface grooves 74 and also communicate with the inner peripheral-side annular recess 55.

The inner peripheral surface 62 of the hollow cylindrical portion 60 and an annular inner peripheral surface 76 of the protruding portion 63 define a through hole 77 which is concentric with the through hole 28 and through which the shaft member of the strut-type suspension is inserted.

As particularly shown in detail in FIG. 5 and FIGS. 14 to 18, the synthetic resin-made thrust sliding bearing piece 5 disposed in the annular space 4 between the annular lower surface 11 of the upper casing base portion 12 and the annular upper surface 51 of the lower casing base portion 52 includes an annular radial bearing piece portion 83 having an annular upper surface 81 which is brought into slidable contact with the annular lower surface 11 of the upper casing base portion 12 and an annular lower surface 82 which is brought into contact with the upper surface 65 of the annular protrusion 53; a cylindrical axial bearing piece portion 86 which is integrally formed at its one end portion on one end portion of the radial bearing piece portion 83 in such a manner as to extend downwardly and has an annular inner side surface 84 which is brought into slidable contact with the outer peripheral surface 31 of the thick-walled cylindrical portion 22 and an annular outer side surface 85 which is brought into contact with the inner peripheral surface 54 of the annular protrusion 53; and a plurality of radial projecting plate piece portions 88 which project outwardly from an outer peripheral surface 87 of the radial bearing piece portion 83, and which are respectively arranged between the projections 66 in the circumferential direction R and clamped by adjacent ones of the projections 66 so that the thrust sliding bearing piece 5 does not rotate in the circumferential direction R with respect to the lower casing 3.

The radial bearing piece portion 83 has an annular groove 91 provided on an inner peripheral side of the upper surface 81 and a plurality of radial grooves 92 which are open at their one ends to the annular groove 91 and is open at their other ends to the outer peripheral surface 87, and which are provided on the upper surface 81 by being spaced apart at equal intervals in the circumferential direction R. The axial bearing piece portion 86 has a plurality of axial grooves 93 which are open at their both ends and are provided on the inner side surface 84 by being spaced apart at equal intervals in the circumferential direction R. The aforementioned annular groove 91, radial grooves 92, and axial grooves 93 serve as a lubricating oil sump.

As shown particularly in detail in FIGS. 19 to 24, the seal member 8 has on its inner peripheral side a flexible inner peripheral-side annular seal portion 103 which is elastically brought into flexural contact with the outer peripheral surface 32 of the thin-walled cylindrical portion 27 of the inner peripheral-side suspended cylindrical portion 14, so as to seal the gap 6 between the thin-walled cylindrical portion 27, i.e., an axial end portion 101 of the inner peripheral-side suspended cylindrical portion 14 of the upper casing 2, and the annular inner peripheral-side protrusion 57, i.e., an inner peripheral end portion 102 of the lower casing base portion 52 of the lower casing 3, and has on its outer peripheral side a flexible outer peripheral-side annular seal portion 106 which is elastically brought into flexural contact with the inner peripheral surface 37 of the cross-sectionally trapezoidal cylindrical portion 38 of the outer peripheral-side suspended cylindrical portion 16, so as to seal the gap 7 between an axial end portion 104 of the outer peripheral-side suspended cylindrical portion 16 of the upper casing 2 and an outer peripheral end portion 105 of the lower casing base portion 52 of the lower casing 3. Further, the seal member 8 has a plurality of connecting portions 107 for connecting the inner peripheral-side annular seal portion 103 and the outer peripheral-side annular seal portion 106 to each other.

Each of the plurality of connecting portions 107 which are arranged by being spaced apart from each other at equal intervals in the circumferential direction R has a radial connecting portion 113 which is integrally connected at its one end portion 111 to an annular inner peripheral end portion 112 of the outer peripheral-side annular seal portion 106, as well as an axial connecting portion 118 which is integrally connected at its one end portion 114 to another end portion 115 of the radial connecting portion 113 and at its other end portion 116 to an annular outer peripheral end portion 117 of the inner peripheral-side annular seal portion 103.

Each of the plurality of connecting portions 107 is integrally connected at its other end portion 116 to the inner peripheral-side annular seal portion 103 and at its one end portion 111 to the outer peripheral-side annular seal portion 106 by being passed between the thrust sliding bearing piece 5 and the annular protrusion 53 of the lower casing 3 as the radial connecting portion 113 is received by each of the upper surface grooves 74 and the axial connecting portion 118 is received by each of the inner peripheral surface grooves 75.

The inner peripheral-side annular seal portion 103 includes an annular inner peripheral seal base portion 131 which is integrally connected at its annular outer peripheral end portion 117 to an axial lower end portion, i.e., the other end portion 116, of the axial connecting portion 118 and which is fitted to the inner peripheral-side annular recess 55, as well as a flexible inner peripheral seal portion 134 which is connected at its outer peripheral end portion 132 to an inner peripheral end portion 133 of the inner peripheral seal base portion 131 and which is elastically brought into flexural contact with the outer peripheral surface 32 of the thin-walled cylindrical portion 27 of the inner peripheral-side suspended cylindrical portion 14.

The inner peripheral seal portion 134 extends diagonally downwardly from the outer peripheral end portion 132 which has a smaller thickness than the thickness of the inner peripheral seal base portion 131 and which is connected to the inner peripheral end portion 133 of the inner peripheral seal base portion 131.

The outer peripheral-side annular seal portion 106 includes an annular outer peripheral seal base portion 141 which is integrally connected at its annular inner peripheral end portion 112 to an outer lower end portion, i.e., the one end portion 111, of the radial connecting portion 113 and which is fitted to the notched stepped portion 71, as well as a flexible outer peripheral seal portion 144 which is connected at its inner peripheral end portion 142 to an outer peripheral end portion 143 of the outer peripheral seal base portion 141 and is elastically brought into flexural contact with the inner peripheral surface 37 of the cross-sectionally trapezoidal cylindrical portion 38 of the outer peripheral-side suspended cylindrical portion 16.

The outer peripheral seal portion 144 extends diagonally downwardly from the inner peripheral end portion 142 which has a smaller thickness than the thickness of the outer peripheral seal base portion 141 and which is connected to the outer peripheral end portion 143 of the outer peripheral seal base portion 141.

An upper surface 151 of the radial connecting portion 113 of the connecting portion 107 is positioned flush with the upper surface 65 of the annular protrusion 53 of the lower casing 3 excluding the upper surface grooves 74, and an inner side surface 152 of the axial connecting portion 118 of the connecting portion 107 is positioned flush with the inner peripheral surface 54 of the annular protrusion 53 of the lower casing 3 excluding the inner peripheral surface grooves 75. Thus, the radial bearing piece portion 83 at its lower surface 82 is in contact with the upper surface 65 of the annular protrusion 53 of the lower casing 3 and the upper surface 151 of the radial connecting portion 113 of the connecting portion 107, and the axial bearing piece portion 86 at its outer side surface 85 is in contact with the inner peripheral surface 54 of the annular protrusion 53 of the lower casing 3 and the inner side surface 152 of the axial connecting portion 118 of the connecting portion 107.

As an alternative to the above-described arrangement, the upper surface 65 of the annular protrusion 53 of the lower casing 3 excluding the upper surface grooves 74 may be positioned higher than the upper surface 151 of the radial connecting portion 113 of the connecting portion 107, and the inner peripheral surface 54 of the annular protrusion 53 of the lower casing 3 excluding the inner peripheral surface grooves 75 may be positioned radially inwardly of the inner side surface 152 of the axial connecting portion 118 of the connecting portion 107. In that case, the axial bearing piece portion 83 at its lower surface 82 is in contact with the upper surface 65 of the annular protrusion 53 of the lower casing 3 while having a gap with the upper surface 151 of the radial connecting portion 113 of the connecting portion 107, and the axial bearing piece portion 86 at its outer side surface 85 is in contact with the inner peripheral surface 54 of the annular protrusion 53 of the lower casing 3 while having a gap with the inner side surface 152 of the axial connecting portion 118 of the connecting portion 107.

The above-described thrust sliding bearing 1 is adapted to allow the relative rotation in the circumferential direction R of the lower casing 3 with respect to the upper casing 2 by the relative sliding in the circumferential direction R of each of the upper surface 81 of the radial bearing piece portion 83 with respect to the annular lower surface 11 of the upper casing base portion 12 and the inner side surface 84 of the axial bearing piece portion 86 with respect to the outer peripheral surface 31 of the thick-walled cylindrical portion 22.

According to the above-described thrust sliding bearing 1, since each of the plurality of connecting portions 107 is integrally connected at its one end portion to the inner peripheral-side annular seal portion 103 and at its other end portion to the outer peripheral-side annular seal portion 106, the number of parts can be reduced, and the assembling efficiency and the replaceability excel, making it possible to attain a reduction in the manufacturing cost. Moreover, since each of the plurality of connecting portions 107 is passed between the thrust sliding bearing piece 5 and the annular protrusion 53 of the lower casing 3, the durability can be improved by eliminating the possibility of coming off.

In addition, according to the thrust sliding bearing 1, since the seal member 8 has the inner peripheral-side annular seal portion 103 for sealing the gap 6 between the inner peripheral-side suspended cylindrical portion 14 of the upper casing 2 and the inner peripheral end portion 102 of the lower casing 3 and the outer peripheral-side annular seal portion 106 for sealing the gap 7 between the outer peripheral-side suspended cylindrical portion 16 of the upper casing 2 and the outer peripheral end portion 105 of the lower casing 3, the sealability can be further improved.

The invention claimed is:

1. A thrust sliding bearing comprising:
    a synthetic resin-made upper casing integrally including an annular upper casing base portion having an annular lower surface in an axial direction, an inner peripheral-side suspended cylindrical portion suspended from a radial inner peripheral end portion of the annular lower surface of the upper casing base portion, and an outer peripheral-side suspended cylindrical portion suspended from a radial outer peripheral end portion of the annular lower surface of the upper casing base portion;
    a synthetic resin-made lower casing integrally including an annular lower casing base portion having an annular upper surface in the axial direction and superposed on said upper casing so as to be rotatable about an axis relative to said upper casing and an annular protrusion protruding from the annular upper surface of the lower casing base portion toward the annular lower surface of the upper casing base portion;
    a synthetic resin-made thrust sliding bearing piece disposed in an annular space between the annular lower surface of the upper casing base portion and the annular upper surface of the lower casing base portion, so as to be brought at an axial annular upper surface and a radial cylindrical inner peripheral surface thereof into slidable contact with the annular lower surface of the upper casing base portion and a radial outer peripheral surface of the inner peripheral-side suspended cylindrical portion, while being brought at an axial annular lower surface and a radial cylindrical outer peripheral surface thereof into contact with an axial annular upper surface and a radial cylindrical inner peripheral surface of the annular protrusion; and
    a synthetic resin-made seal member having on a radial inner peripheral side thereof a flexible inner peripheral-side annular seal portion which is brought into contact with a radial inner peripheral surface of the inner peripheral-side suspended cylindrical portion of the upper casing so as to seal a gap between the inner peripheral-side suspended cylindrical portion of said upper casing and the lower casing base portion of said lower casing, having on a radial outer peripheral side thereof a flexible outer peripheral-side annular seal portion which is brought into contact with an radial inner peripheral surface of the outer peripheral-side suspended cylindrical portion of said upper casing so as to seal a gap between the outer peripheral-side suspended cylindrical portion of said upper casing and the lower casing base portion of said lower casing, and having a plurality of connecting portions arranged by being spaced apart from each other in a direction about the axis, so as to connect to each other the inner peripheral-side annular seal portion and the outer peripheral-side annular seal portion,
    wherein each of the plurality of connecting portions is passed between said thrust sliding bearing piece and the annular protrusion of said lower casing and is integrally connected at one end portion thereof to the inner peripheral-side annular seal portion and at another end portion thereof to the outer peripheral-side annular seal portion,
    wherein each of the connecting portions of said seal member has a radial connecting portion which is integrally connected at one radial end portion thereof to the outer peripheral-side annular seal portion and an axial connecting portion which is integrally connected at one axial end portion thereof to another radial end portion of the radial connecting portion and at another axial end portion thereof to the inner peripheral-side annular seal portion,
    wherein the annular protrusion of said lower casing has upper surface grooves which are arranged on an axial upper surface thereof by being spaced apart from each other in a direction about the axis and receive respective ones of the radial connecting portions of the connecting portions and inner peripheral surface grooves which are arranged on a radial inner peripheral surface thereof by being spaced apart from each other in the direction about the axis and connected to respective ones of the upper surface grooves and receive respective ones of the axial connecting portions of the connecting portions,
    wherein the upper surface of the annular protrusion of the lower casing excluding the upper surface grooves is positioned flush with or higher than an axial upper surface of the radial connecting portion of the connecting portion, and the inner peripheral surface of the annular protrusion of the lower casing excluding the inner peripheral surface grooves is positioned flush with or radially inwardly of a radial inner side surface of the axial connecting portion of the connecting portion, and
    wherein said thrust sliding bearing piece has a radial bearing piece portion which is in contact with the upper surface of the annular protrusion of the lower casing and an axial bearing piece portion which is in contact with the inner peripheral surface of the annular protrusion of the lower casing.

2. The thrust sliding bearing according to claim 1,
wherein the annular protrusion has an annular notched stepped portion on a radial outer peripheral portion of the upper surface thereof, and the flexible outer peripheral-side annular seal portion has an annular outer peripheral seal base portion which is integrally connected at a radial inner peripheral end portion thereof to a radial outer end portion of the radial connecting portion and is fitted to the notched stepped portion and a flexible outer peripheral seal portion which is connected at a radial inner peripheral end portion thereof to a radial outer peripheral end portion of the outer peripheral seal base portion and is brought into contact with an inner peripheral surface of the outer peripheral-side suspended cylindrical portion of said upper casing.

3. The thrust sliding bearing according to claim 1,
wherein said lower casing has integrally with the lower casing base portion an annular inner peripheral-side protrusion protruding from a radial inner peripheral portion of the annular upper surface of the lower casing base portion toward an annular lower surface of the upper casing base portion so as to form an inner peripheral-side annular recess in cooperation with the inner peripheral surface of the annular protrusion, and the inner peripheral-side annular seal portion has an annular inner peripheral seal base portion which is integrally connected at a radial outer peripheral end portion thereof to an axial lower end portion of the axial connecting portion and which is fitted to the inner peripheral-side annular recess, as well as a flexible inner peripheral seal portion which is connected at a radial outer peripheral end portion to a radial inner peripheral end portion of the inner peripheral seal base portion and which is brought into contact with the outer peripheral surface of the inner peripheral-side suspended cylindrical portion of said upper casing.

\* \* \* \* \*